United States Patent [19]
Hirose et al.

[11] Patent Number: 5,838,371
[45] Date of Patent: Nov. 17, 1998

[54] IMAGE PICKUP APPARATUS WITH INTERPOLATION AND EDGE ENHANCEMENT OF PICKUP SIGNAL VARYING WITH ZOOM MAGNIFICATION

[75] Inventors: Hisataka Hirose; Toshiaki Kondo, both of Kanagawa-ken; Izumi Matsui, Tokyo, all of Japan

[73] Assignee: Canon Kabushiki Kaisha, Tokyo, Japan

[21] Appl. No.: 892,342

[22] Filed: Jul. 14, 1997

Related U.S. Application Data

[63] Continuation of Ser. No. 204,788, Mar. 2, 1994, abandoned.

[30] Foreign Application Priority Data

Mar. 5, 1993 [JP] Japan .................................. 5-044940
Mar. 19, 1993 [JP] Japan .................................. 5-085572
Jul. 16, 1993 [JP] Japan .................................. 6-176778

[51] Int. Cl.[6] .................................................. H04N 5/262
[52] U.S. Cl. .......................................... 348/240; 348/252
[58] Field of Search .................................. 348/240, 231, 348/233, 252, 71, 222, 253

[56] References Cited

U.S. PATENT DOCUMENTS

| | | | |
|---|---|---|---|
| 4,479,145 | 10/1984 | Azuma et al. | 358/106 |
| 4,517,599 | 5/1985 | Zwirn et al. | 358/166 |
| 4,704,632 | 11/1987 | Van Den Heuvel | 358/209 |
| 4,779,142 | 10/1988 | Freeman et al. | 358/313 |
| 4,783,840 | 11/1988 | Song | 382/54 |
| 4,891,697 | 1/1990 | Saito et al. | 348/71 |
| 4,933,758 | 6/1990 | Saito et al. | 348/71 |
| 4,937,676 | 6/1990 | Finelli et al. | 359/229 |
| 4,963,981 | 10/1990 | Todaka et al. | 358/213.13 |
| 4,969,043 | 11/1990 | Pothier | 358/213.27 |
| 5,031,036 | 7/1991 | Kikuchi et al. | 348/71 |
| 5,032,928 | 7/1991 | Sakai | 358/448 |
| 5,083,208 | 1/1992 | Hatanaka | 348/240 |
| 5,311,328 | 5/1994 | Murata | 358/447 |
| 5,374,995 | 12/1994 | Loveridge et al. | 348/240 |
| 5,384,581 | 1/1995 | Ikeda | 348/717 |
| 5,428,391 | 6/1995 | Murata | 348/240 |
| 5,457,546 | 10/1995 | Hong | 348/717 |

*Primary Examiner*—Victor R. Kostah
*Attorney, Agent, or Firm*—Robin, Blecker & Daley

[57] ABSTRACT

The amount of edge enhancement outputted from an amount-of-edge-enhancement computing circuit is determined on the basis of the degree of sharpness of the edge independently of a zoom magnification. In the meantime, in an enhancement coefficient computing circuit, an enhancement coefficient according to the zoom magnification is computed. In a multiplier, the output from the amount-of-edge-enhancement computing circuit (the amount of edge enhancement) is multiplied by the output from the enhancement coefficient computing circuit (the enhancement coefficient). The resultant amount of edge correction is outputted from the multiplier. Accordingly, the amount of edge correction outputted from the multiplier takes a value according to the zoom magnification. According to this arrangement, enhancement processing which does not bring about overcorrection or unprocessing can be applied to the edge portion of an image enlarged by electronic zoom. In consequence, it is possible to enhance the apparent resolution of the image enlarged by electronic zoom.

6 Claims, 11 Drawing Sheets

F I G. 8 (a)
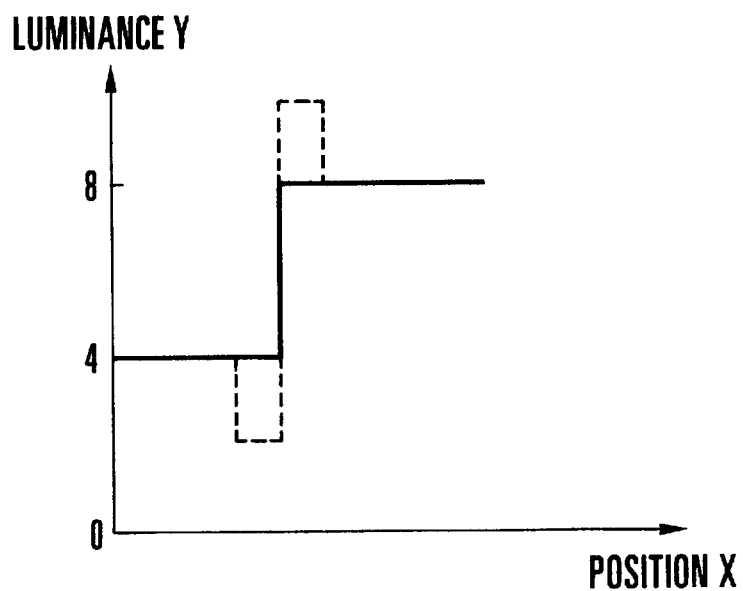
F I G. 8 (b)
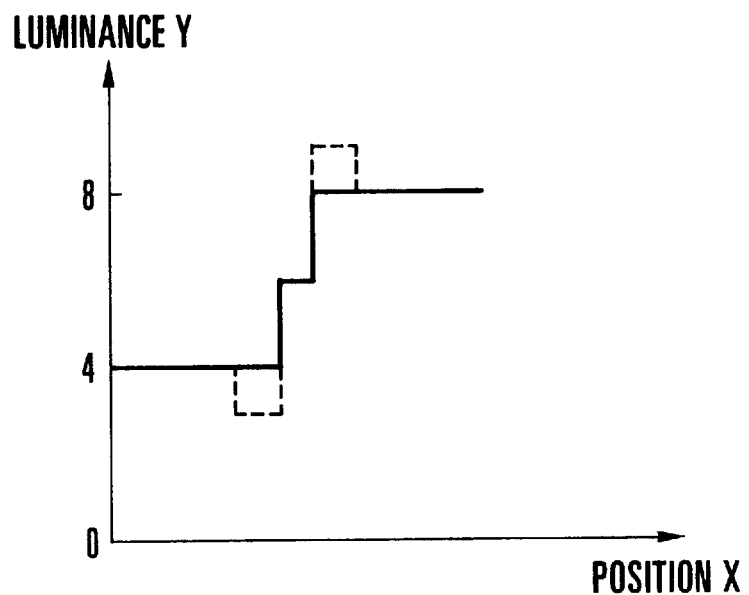

IMAGE PICKUP APPARATUS WITH INTERPOLATION AND EDGE ENHANCEMENT OF PICKUP SIGNAL VARYING WITH ZOOM MAGNIFICATION

This is a continuation application under 37 CFR 1.62 of prior application Ser. No. 08/204,788, filed Mar. 2, 1994 now abandoned.

BACKGROUND OF THE INVENTION

1. Field of the Invention

The present invention relates to an image pickup apparatus provided with an electronic-zoom function.

2. Description of the Related Art

A so-called electronic zoom has heretofore been known. In the electronic zoom, an image pickup signal is temporarily written into a field memory, and the image pickup signal is read from the field memory while varying the timing of reading therefrom and interpolation data is added to the image pickup signal read from the field memory, thereby electronically enlarging or reducing the picked-up image.

This kind of image pickup apparatus has the disadvantage that if an image is enlarged by the electronic zoom, the sampling frequency of the image becomes lower and the horizontal and vertical resolutions of the image are degraded, so that an image having a low apparent resolution is produced. For this reason, to improve apparent resolution, it has been proposed to introduce an enhancer for performing edge enhancement.

As described above, if an image is enlarged by using the electronic zoom, the sampling frequency becomes lower and the horizontal and vertical resolutions are degraded, so that an image having a low apparent resolution is produced.

One method for preventing the lowering of the apparent resolution due to the resolution degradation is to incorporate a high-definition CCD and a large-magnification lens into the apparatus. However, this method involves a cost increase and a body of large volume.

For this reason, the method of introducing an edge enhancer is presently proposed. However, since the enhancement coefficients of conventionally proposed edge enhancers are fixed, as the magnification of the electronic zoom varies, an edge which is overcorrected or unprocessed may occur. As a result, it is impossible to obtain an enlarged image which creates a stable and high apparent resolution.

FIG. 1 is a block diagram showing a conventional example. The arrangement shown in FIG. 1 includes a memory circuit 2 arranged to store an input video signal and output a signal on a scanning line n specified by a memory reading control signal as well as a signal on a scanning line n-1 which delayed by 1H from the scanning line n, a memory control signal generating circuit 4 for controlling the reading and writing operations of the memory circuit 2, an enlargement ratio setting circuit 6 for setting an enlargement ratio, an interpolation coefficient generating circuit 8 for generating an interpolation coefficient on the basis of the enlargement ratio set by the enlargement ratio setting circuit 6, multipliers 14 and 16, and an adder 18.

The signal on the scanning line n and the signal on the scanning line n-1 are read from the memory circuit 2 in which the input video signal is stored, in accordance with a memory control signal. Simultaneously, the interpolation coefficient generating circuit 8 outputs an interpolation coefficient according to the distance between a signal to be interpolated and the signal on the scanning line n and an interpolation coefficient according to the distance between the signal to be interpolated and the signal on the scanning line n-1. The respective interpolation coefficients are multiplied by the signal on the line n and the signal on the line n-1. When the results of both multiplications are added together in the adder 18, a linear interpolation signal can be obtained.

The operation of a vertical aperture correction circuit will be described below. The arrangement shown in FIG. 1 also includes a vertical aperture correction signal generating circuit 40, a gain control circuit 42 for controlling the gain of a vertical aperture correction signal on the basis of the value of an interpolation coefficient which is the output signal of the interpolation coefficient generating circuit 8, a multiplier 44, and an adder 46. FIG. 2 shows the relationship between the interpolation coefficient and the gain signal in the gain control circuit 42. As shown in FIG. 2, gain control is performed so that when the interpolation coefficient is 0.5, the gain of the vertical aperture correction signal reaches its maximum since the resolution of a linearly interpolated signal becomes lowest, as well as so that when the interpolation coefficient is 0 or 1.0, the gain of the vertical aperture correction signal reaches its minimum since no resolution of a linearly interpolated signal degrades. The signal obtained by controlling the gain of the vertical aperture correction signal in the multiplier 44 is added to the linear interpolation signal in the adder 46.

In the above-described manner, it is possible to obtain a video signal of uniform resolution by applying vertical aperture correction based on an interpolation signal to a signal indicative of an image enlarged by linear interpolation.

However, in the conventional method, to perform such vertical aperture correction, at least two line memories are needed and an increase in circuit scale and a cost increase are incurred.

SUMMARY OF THE INVENTION

It is, therefore, an object of the present invention to provide an image pickup apparatus capable of applying enhancement processing which does not bring about overcorrection or unprocessing to the edge portion of an image enlarged by electronic zoom, thereby improving the apparent resolution of the image enlarged by electronic zoom.

Another object of the present invention is to reduce the circuit scale and the cost of this kind of apparatus.

To achieve the above objects, in accordance with one aspect of the present invention, there is provided an image pickup apparatus arranged to temporarily store an image pickup signal in a memory and execute a zoom function by varying a reading timing of the memory. In the image pickup apparatus, means is provided on an output side of the memory for computing the amount of edge correction on the basis of a zoom magnification and applying edge enhancement based on the computed amount of edge correction to an image signal read from the memory or an image signal obtained by applying interpolation processing to the read image signal.

According to the arrangement of the above-described aspect of the present invention, the amount of edge correction is computed on the basis of a zoom magnification and edge enhancement based on the computed amount of edge correction is applied to an image signal read from the memory or an image signal obtained by applying interpolation processing to the read image signal. Accordingly, enhancement processing which does not bring about overcorrection or unprocessing is applied to the edge portion of an image enlarged by electronic zoom, so that it is possible to improve the apparent resolution of the image enlarged by electronic zoom.

To achieve the above objects, in accordance with another aspect of the present invention, there is provided an image enlarging apparatus which comprises an interpolation circuit for applying interpolation processing to the horizontal lines of an input video signal and a controlling circuit for controlling an interpolation coefficient for the interpolation processing on the basis of a difference value between signal levels of a plurality of horizontal lines of the input video signal.

According to the above-described aspect, since the interpolation coefficient for the interpolation processing is controlled on the basis of a difference value between the signal levels of a plurality of horizontal lines of the input video signal to be subjected to the interpolation processing, it is possible to control the interpolation coefficient without the need to increase the circuit scale of the apparatus.

According to another aspect of the present invention, there is provided an image pickup apparatus which comprises an image pickup element for performing photoelectric conversion and a controlling circuit for controlling the gain of an enhancer for aperture correction on the basis of a shutter speed of the image pickup element and the amount of relative position deviation between the image pickup apparatus and a subject.

Accordingly, it is possible to change the gain of the enhancer by using motion information about an image, on the basis of a shutter speed of the image pickup element and the amount of relative position deviation between the image pickup apparatus and a subject. Therefore, it is possible to discriminate between an originally unsharp edge which constitutes part of the shape of the subject and an edge which has been made unsharp by an image shake, whereby appropriate enhancements can be applied to the respective edges.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 8(a) and 8(b) are views showing one example of the operation of an enhancer for aperture correction;

DETAILED DESCRIPTION OF THE PREFERRED EMBODIMENTS

First Embodiment

A first embodiment of the present invention which will be described below includes an image pickup sensor for converting video information obtained via a lens into an electrical signal, an A/D converter, an image pickup signal processing circuit, a field memory, a writing address generating circuit for generating a writing address for the field memory, a reading address generating circuit for generating a reading address for the field memory, an interpolation circuit for reading an image pickup signal at a timing different from the timing of writing to the field memory and applying interpolation to an enlarged image, an edge enhancer for performing edge enhancement, and a D/A converter, the above-described elements being connected to each other in series. In this arrangement, an image pickup signal inputted via the lens is subjected to A/D conversion by the A/D converter, and the resultant analog signal is subjected to image pickup signal processing by the image pickup signal processing circuit. The output from the image pickup signal processing circuit is written to the addresses of the field memory which are specified by the writing address generating circuit, and data is read from the addresses of the field memory which are specified by the reading address generating circuit, at a timing different from the timing of the writing to the addresses of the field memory, thereby enlarging or reducing a video image. Pixel-data interpolation of the enlarged (or reduced) image signal is performed by the interpolation circuit, and edge enhancement of the edge of the enlarged (or reduced) image is performed by the edge enhancer on the basis of a zoom magnification. The output signal of the edge enhancer is converted into an analog signal by the D/A converter, and the analog signal is inputted into a recording apparatus (or made externally available).

The first embodiment of the present invention will be described below with reference to FIGS. 3 and 4.

Figure 1:
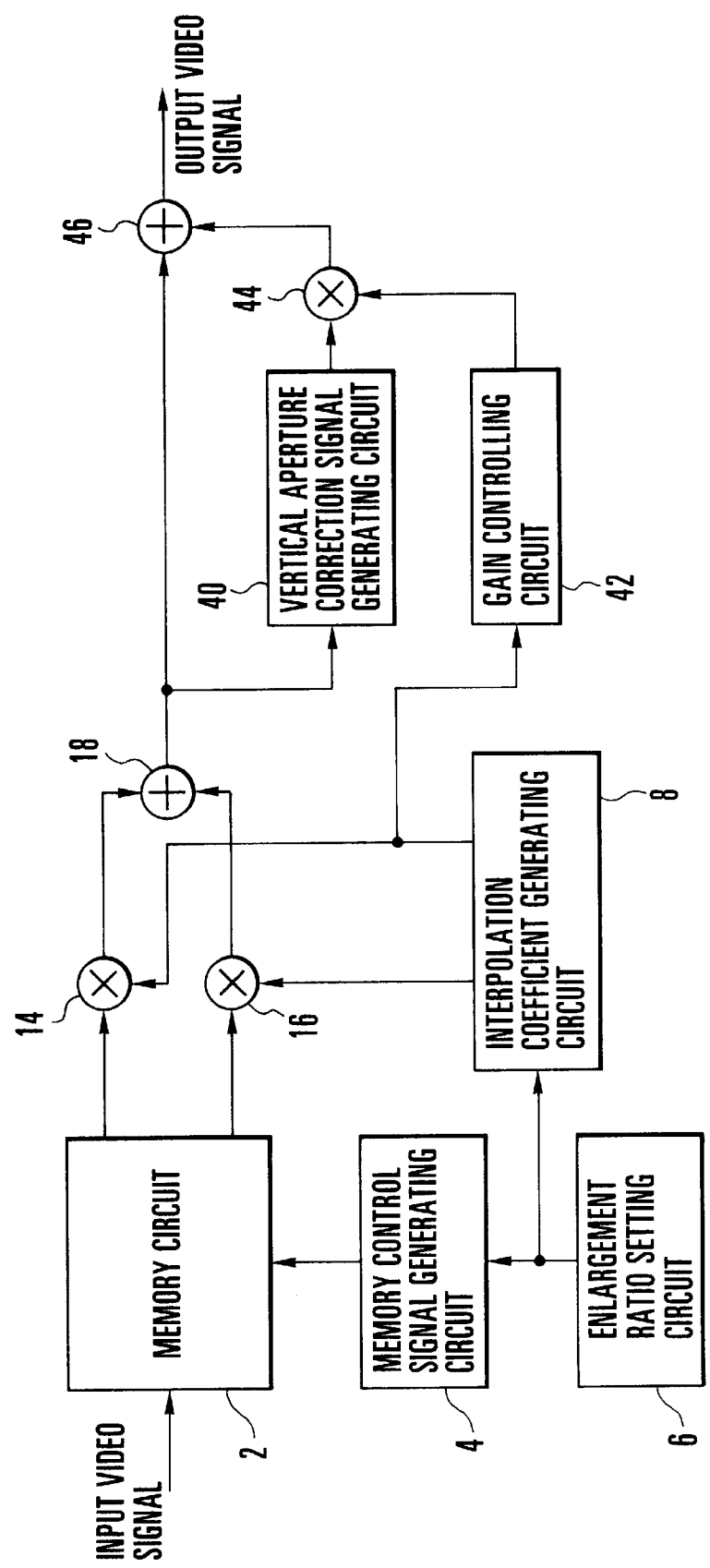
FIG. 1 is a block diagram showing a conventional example.
Figure 2:
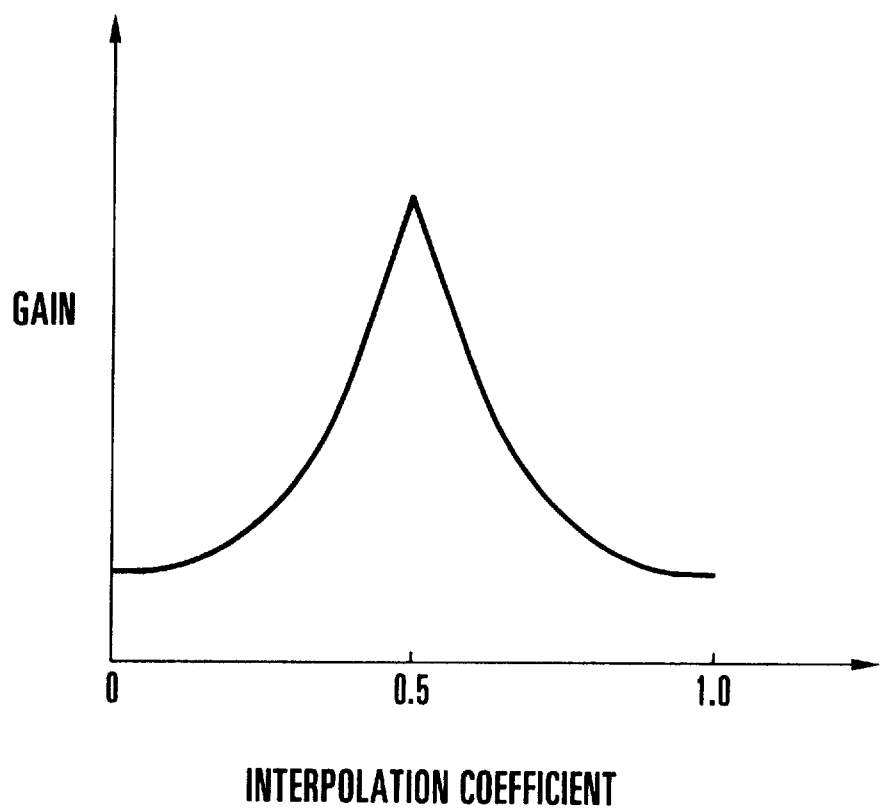
FIG. 2 is a graphic representation showing the relationship between an interpolation coefficient and a gain.
Figure 3:
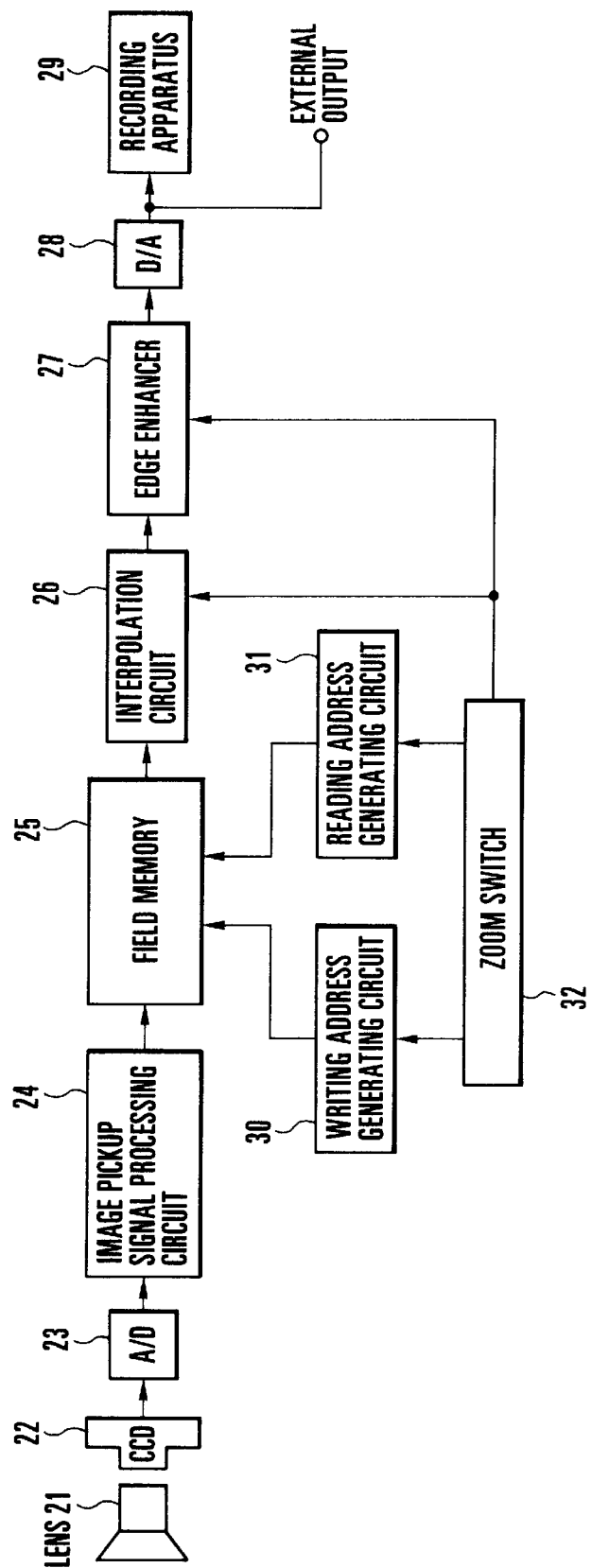
FIG. 3 is a block diagram showing the entire arrangement of a first embodiment of the present invention.

FIG. 3 is a block diagram schematically showing the entire arrangement of the first embodiment of the present invention.

The arrangement shown in FIG. 3 includes a lens 21 which has constituent elements such as an image pickup lens, an iris and a filter, a CCD 22 which serves as an image pickup sensor, an A/D converter 23, an image pickup signal processing circuit 24 which has a gamma correction circuit for executing gamma correction by digital processing, as well as a low-pass filter and a clipping circuit, a field memory 25, an interpolation circuit 26 for interpolating interpixel data of an image read from the field memory 25, an edge enhancer 27 for detecting an edge and executing edge enhancement, a D/A converter 28, a recording apparatus 29, a writing address generating circuit 30 for controlling writing addresses for the field memory 25, a reading address generating circuit 31 for controlling reading addresses for the field memory 25, and a zoom switch 32 for outputting a signal according to a zoom magnification.

The operation of the first embodiment will be described below.

An image optically inputted by the lens 21 is converted into an image pickup signal by the CCD 22. Then, the image pickup signal is converted into a digital signal by the A/D converter 23. The digital signal is subjected to predetermined processings, such as gamma correction, low-pass filtering and clipping processing, in the image pickup signal processing circuit 24 which is provided in the next stage of the A/D converter 23.

Writing addresses for the field memory 25 are determined by the writing address generating circuit 30 on the basis of a signal according to a zoom magnification, which is outputted from the zoom switch 32. Thus, the output from the image pickup signal processing circuit 24 is written to the addresses of the field memory 25 which are outputted from the writing address generating circuit 30.

Then, the reading address generating circuit 31 determines reading addresses for the field memory 25 on the basis of the signal according to the zoom magnification, which is outputted from the zoom switch 32. The image data stored in the field memory 25 is read out at a timing different from the timing of writing into the field memory 25, whereby enlargement (or reduction) of the stored image is effected.

The image data outputted from the field memory 25 is inputted into the interpolation circuit 26. The interpolation circuit 26 computes interpolation data from the zoom magnification specified through the zoom switch 32 and applies interpolation processing to the inputted image data. The output from the interpolation circuit 26 is inputted into the edge enhancer 27 and subjected to edge enhancement according to the zoom magnification signal outputted from the zoom switch 32. The output from the edge enhancer 27 is subjected to D/A conversion by the D/A converter 28, and the obtained analog signal is recorded by the recording apparatus 29.

Figure 4:
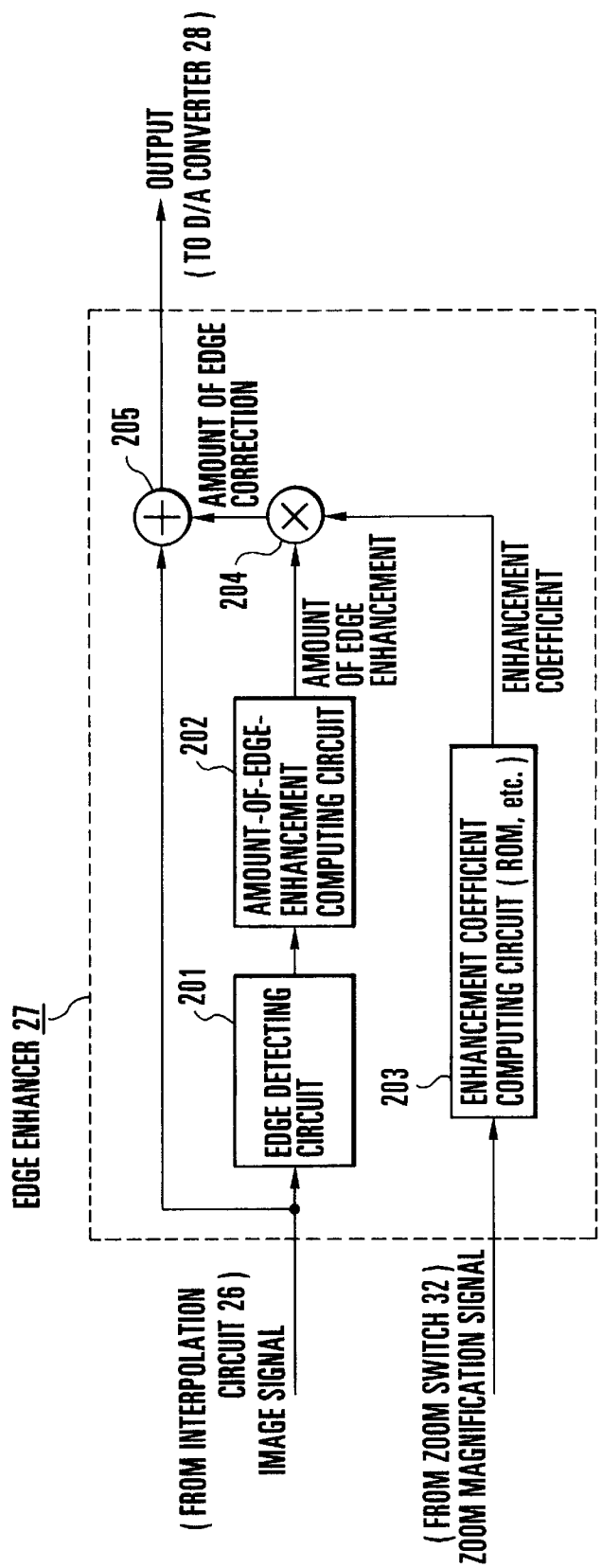
FIG. 4 is a detailed circuit diagram of the edge enhancer 27 shown in FIG. 3.

FIG. 4 is a detailed circuit diagram showing the edge enhancer 27 shown in FIG. 3. The edge enhancer 27 shown in FIG. 4 includes an edge detecting circuit 201, an amount-of-edge-enhancement computing circuit 202, an enhancement coefficient computing circuit 203, a multiplier 204 and an adder 205.

The image signal inputted into the edge enhancer 27 (the output signal of the interpolation circuit 26) is subjected to edge detection by the edge detecting circuit 201. The amount-of-edge-enhancement computing circuit 202 which is provided in the next stage of the edge enhancer 27 calculates the amount of edge enhancement on the basis of the degree of sharpness of the detected edge. In this amount-of-edge-enhancement computing circuit 202, predetermined processings, such as a conversion processing using a ROM table and a function computation, are performed.

The amount of edge enhancement outputted from the amount-of-edge-enhancement computing circuit 202 is determined on the basis of the degree of sharpness of the edge independently of the zoom magnification. In the meantime, in the enhancement coefficient computing circuit 203, an enhancement coefficient according to the zoom magnification is computed.

In the multiplier 204, the output from the amount-of-edge-enhancement computing circuit 202 (the amount of edge enhancement) is multiplied by the output from the enhancement coefficient computing circuit 203 (the enhancement coefficient). The resultant amount of edge correction is outputted from the multiplier 204. Accordingly, the amount of edge correction outputted from the multiplier 204 takes a value according to the zoom magnification.

In the adder 205, a signal indicative of the aforesaid amount of edge correction is added to the edge portion of the image signal outputted from the interpolation circuit 26.

As described above, according to the first embodiment of the present invention, since the amount of edge correction is controlled according to a zoom magnification, enhancement processing which does not bring about overcorrection nor unprocessing can be applied to the edge portion of an image enlarged by electronic zoom. In consequence, it is possible to enhance the apparent resolution of the image enlarged by electronic zoom.

Second Embodiment

Figure 5:
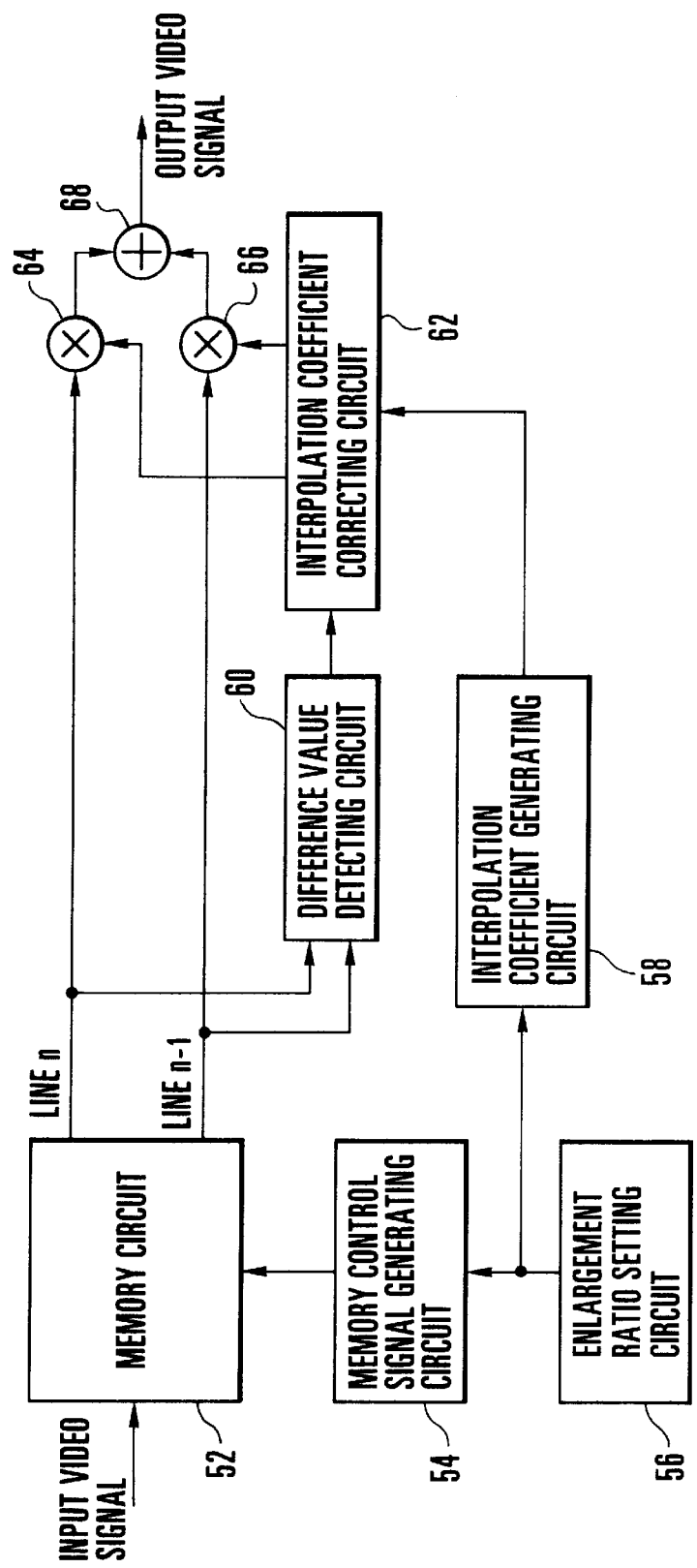
FIG. 5 is a block diagram showing a second embodiment of the present invention.

FIG. 5 is a block diagram showing a second embodiment of the present invention. The arrangement shown in FIG. 5 includes a memory circuit 52 arranged to store an input video signal and output a signal on a scanning line n specified by a memory reading control signal as well as a signal on a scanning line n-1 which is delayed by 1H from the scanning line n, a memory control signal generating circuit 54 for controlling the reading and writing operations of the memory circuit 52, an enlargement ratio setting circuit 56 for setting an enlargement ratio, an interpolation coefficient generating circuit 58 for generating an interpolation coefficient on the basis of the enlargement ratio set by the enlargement ratio setting circuit 56, a difference value detecting circuit 60 for detecting a difference value between the signal on the scanning line n and the signal on the scanning line n-1 which is delayed by 1H from the scanning line n, which signals are outputted from the memory circuit 52, an interpolation coefficient correcting circuit 62 for correcting the value of the output signal of the interpolation coefficient generating circuit 58 on the basis of the output signal of the difference value detecting circuit 60, multipliers 64 and 66, and an adder 68.

Figure 6:
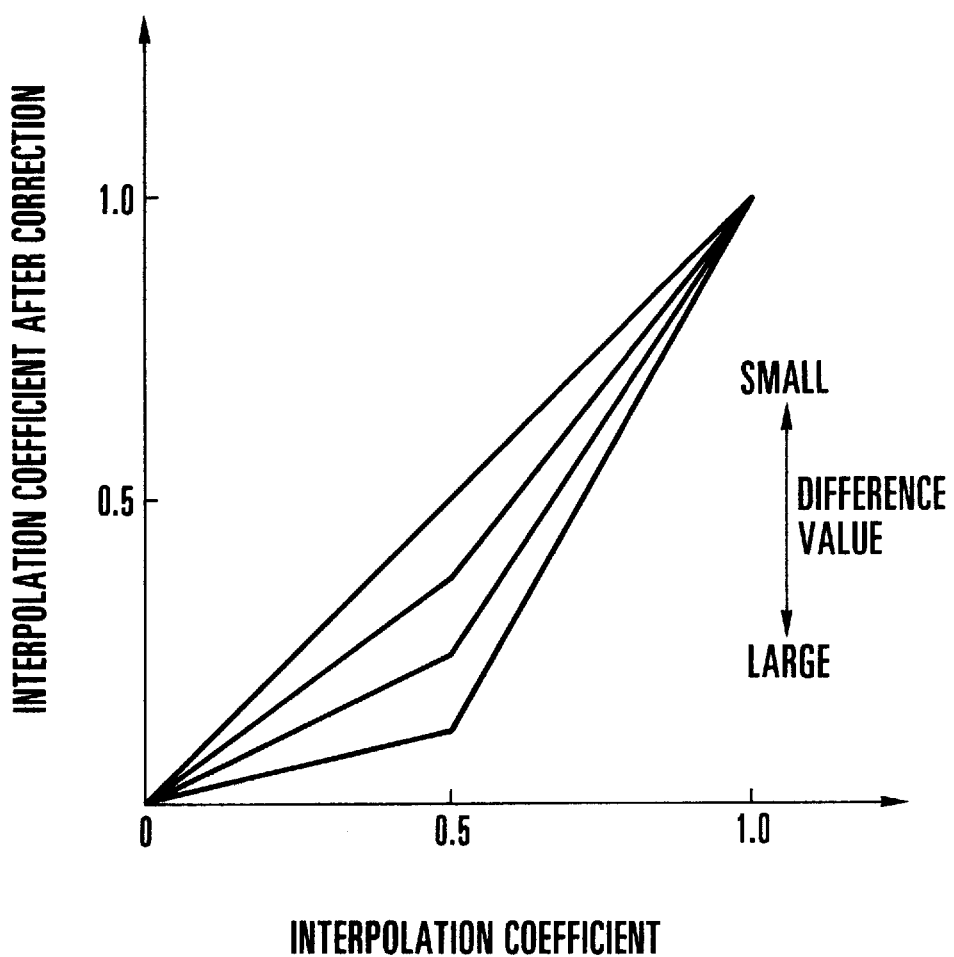
FIG. 6 is a view showing the relationship between interpolation coefficients after and before correction.

The signal on the scanning line n and the signal on the scanning line n-1 are read from the memory circuit 52 in which the input video signal is stored, in accordance with a memory control signal. Also, the interpolation coefficient generating circuit 58 outputs an interpolation coefficient according to the distance between a signal to be interpolated and the signal on each of the scanning lines n and n-1. This interpolation coefficient is corrected by the interpolation coefficient correcting circuit 62 on the basis of a difference value which is the output signal of the difference value detecting circuit 60 for detecting a difference value between the signal on the scanning line n outputted from the memory circuit 52 and the signal on the scanning line n-1 which is delayed by 1H. Then, the corrected interpolation coefficient is outputted from the interpolation coefficient correcting circuit 62 to both of the multipliers 64 and 66. FIG. 6 shows the relationship between the difference value and the interpolation coefficient in the interpolation coefficient correcting circuit 62.

As shown in FIG. 6, the interpolation coefficient correcting circuit 62 performs control in the following manner: if the difference value takes its smallest value, an interpolation coefficient signal after the aforesaid correction, which is outputted from the interpolation coefficient correcting circuit 62, takes the same value as an interpolation coefficient signal which is inputted into the interpolation coefficient correcting circuit 62: and as the difference value becomes larger, the value of the output interpolation coefficient signal becomes smaller than that of the input interpolation coefficient signal. In the multipliers 64 and 66, the signal on the scanning line n and the signal on the scanning line n-1 are each multiplied by the aforesaid interpolation coefficient. The outputs from the multipliers 64 and 66 are added together in the adder 68.

In the conventional arrangement, in a case where a steep edge is contained in a signal to be interpolated, if the interpolation coefficient is in the vicinity of 0.5, a high-frequency component is lost by interpolation, resulting in a decrease in resolution. However, according to the present embodiment having the above-described arrangement, by detecting the difference value between signals to be interpolated, in the case of a steep edge, an interpolation coefficient is corrected to be a value smaller than 0.5, whereby it is possible to prevent degradation of the resolution.

Also, since no correction using the interpolation coefficient is applied to an edge portion which varies moderately, a smoothly interpolated signal can be obtained.

Further, according to the present embodiment, it is possible to achieve the great advantage of realizing the above-described advantage without using a line memory (without using a vertical aperture correction circuit).

Third Embodiment

Figure 7:
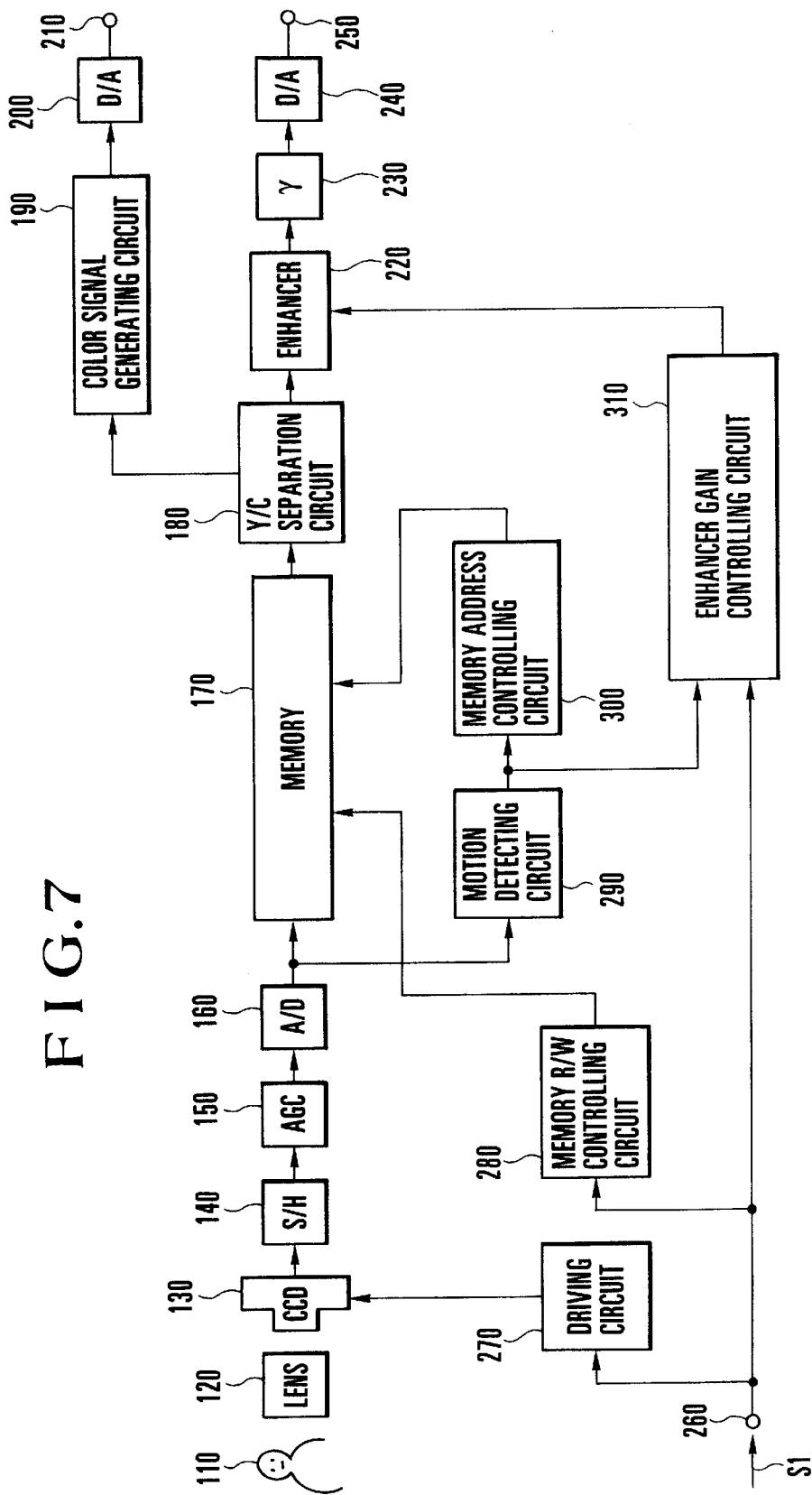
FIG. 7 is a block diagram showing an image pickup apparatus according to a third embodiment of the present invention.
Figure 9A:
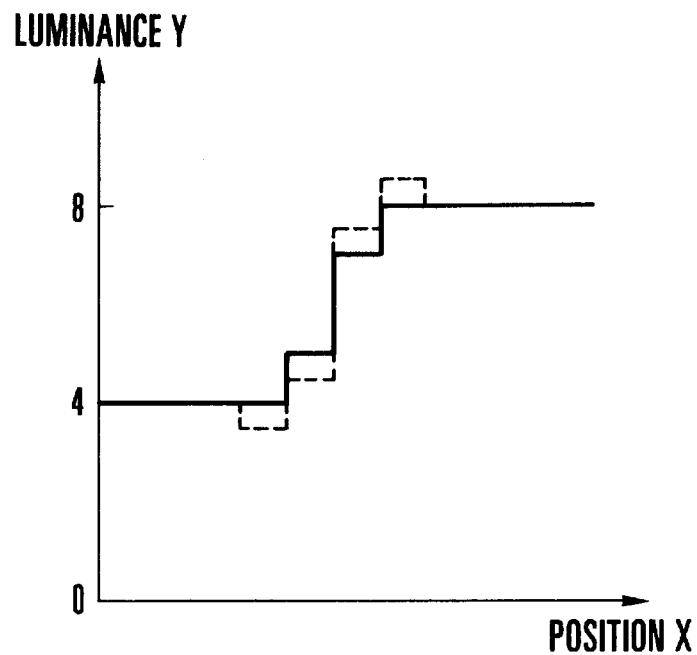
FIGS. 9(a) and 9(b) are views showing another example of the operation of an enhancer for aperture correction.
Figure 9B:
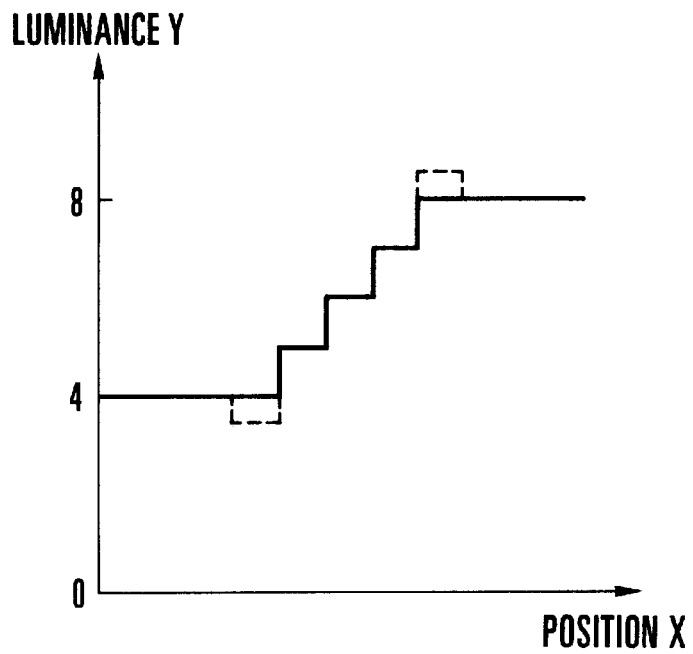

FIG. 7 is a block diagram showing the arrangement of an image pickup apparatus according to a third embodiment of the present invention. In FIG. 7, reference numeral 110 denotes a subject. The arrangement shown in FIG. 7 includes an image pickup lens 120, an image pickup sensor 130 consisting of, for example, a two-dimensional CCD, and a sample-and-hold (S/H) circuit 140 for holding an signal outputted from the image pickup sensor 130 such as a two-dimensional CCD.

The arrangement shown in FIG. 7 also includes an automatic gain control (AGC) circuit 150, an analog-to-digital (A/D) converter 160, an image memory 170, a Y/C separation circuit 180, a color signal generating circuit 190, a digital-to-analog (D/A) converter 200 for D/A conversion of a color signal, and a color signal output terminal 210.

The shown arrangement also includes an enhancer 220 for enhancing the high-frequency component of a luminance signal, a gamma correction circuit 230, a digital-to-analog (D/A) converter 240 for D/A conversion of the luminance signal, and a luminance signal (Y) output terminal 250.

The shown arrangement further includes an input terminal 260 for input of a shutter speed signal, a driving circuit 270 for the image pickup sensor 130, a circuit 280 for controlling the writing and reading operations of the image memory 170, a motion detecting circuit 290, a memory address controlling circuit 300 and an enhancer gain controlling circuit 310.

The operation of the image pickup apparatus shown in FIG. 7 will be described below. An optical image of the subject 110 is focused on the image pickup sensor 130 by the image pickup lens 120 and photoelectrically converted by the image pickup sensor 130. The exposure time of the image pickup sensor 130 is determined by a shutter speed signal S1 inputted to the shutter speed input terminal 260 from the outside, and a shutter speed, i.e., a charge storage time, the timing of outputting a signal and the like are determined.

The sample-and-hold circuit 140 holds the output signal of the image pickup sensor 130, and the AGC circuit 150 which is provided in the next stage of the sample-and-hold circuit 140 automatically controls the gain of the signal. The A/D converter 160 performs analog-to-digital conversion of the output signal of the AGC circuit 150. The digital signal provided by the A/D converter 160 is stored in the image memory 170.

The image memory 170 may be, for example, a field memory or a frame memory, depending on purposes. The timing of reading from and writing to the image memory 170 is also determined by the shutter speed signal S1 inputted to the shutter speed input terminal 260 from the outside, and the image memory 170 is controlled by the memory writing and reading controlling circuit 280.

The motion detecting circuit 290 processes the digital signal outputted from the A/D converter 160 and detects the amount of relative image deviation between an image suppled as the current picture and an image supplied as the immediately previous picture. The motion detecting circuit 290 may utilize a circuit based on the "time-space gradient method" set forth in U.S. Pat. No. 3,896,402, Japanese Patent Publication No. Sho 60-46878, etc. Otherwise, the motion detecting circuit 290 may utilize a circuit based on a matching computation, which is discussed in detail in "Information Processing", Vol. 17, No. 7, Pages 634–640, July (1976) by Morio Onoue, et al.

In the third embodiment, it is necessary to use a detection method capable of real-time processing. Specifically, the amount of image deviation detected by the motion detecting circuit 290 is inputted to both of the memory address controlling circuit 300 and the enhancer gain controlling circuit 310.

The memory address controlling circuit 300 specifies the leading address of an area to be outputted from the image memory 170, on the basis of the amount of image deviation, and controls the image memory 170 so that an area corresponding to the area outputted as the immediately previous picture can be outputted as the current picture, thereby effecting correction of an image shake. In consequence, an output image to be outputted to the viewfinder of a recording video camera, a recording system, etc., becomes a stable video image free from an image shake, such as a camera shake.

The output signal of the image memory 170 is separated into a color signal and a luminance signal by the Y/C separation circuit 180. The color signal is given to the color signal generating circuit 190, in which it is converted into a normal color signal of an RGB format, etc. The normal color signal is converted into an analog signal by the D/A converter 200 which is provided in the next stage of the color signal generating circuit 190, and the analog signal is outputted through the color signal output terminal 210.

In the meantime, the luminance signal is given to the enhancer 220. In the enhancer 220, to improve the image quality, the luminance signal is subjected to the processing of enhancing a high-frequency component such as the edge of the subject image. At this time, the gain of the enhancement component added to the original signal is determined by the enhancer gain controlling circuit 310.

The gamma correction circuit 230 which is provided in the next stage of the enhancer 220 serves to widen the dynamic range of the luminance signal while preventing a saturation in its highlight portion. The luminance signal which has been subjected to the above-described processes is converted into an analog signal by the D/A converter 240. The analog signal is outputted through the luminance signal output terminal 250.

The operational principle of the enhancer gain controlling circuit 310 will be described below. FIGS. 8(a), 8(b) and 9(a), 9(b) show edges which are travelling at a constant speed toward the right as viewed in the respective figures. Shutter speeds become slower in the order of FIG. 8(a) →FIG. 8(b)→FIG. 9(a)→FIG. 9(b), and the edge portions become less sharp in that order.

In each of the figures, the dashed lines represent edges obtained by executing enhancement processing at a constant gain. As can be seen from these figures, the sharper the edge, the larger the amount of enhancement; that is to say, the less sharp the edge, the smaller the amount of enhancement. Accordingly, in the enhancer gain controlling circuit 310, the gain is controlled so that the slower the shutter speed or the larger the amount of relative position deviation between the image pickup apparatus and a subject, the amount of enhancement is made larger.

The enhancer gain is represented by the following equation:

$$G = \beta \times v \times \Delta t + \alpha$$

where $\Delta t$ represents the shutter speed; v represents the amount of relative position deviation between the image pickup apparatus and the subject; $\alpha$ and $\beta$ represent appropriate constants; and G represents the enhancer gain.

It is also possible to adopt an arrangement in which, for example, appropriate thresholds are set for the shutter speed $\Delta t$ and the amount of motion v, respectively. In this arrangement, one of the shutter speed $\Delta t$ and the amount of motion v may be employed as a "switch" for the other in such a way that if the shutter speed $\Delta t$ exceeds its threshold, the enhancer gain may be varied on the basis of the amount of motion v, or if the amount of motion v exceeds its threshold, the enhancer gain may be varied on the basis of the shutter speed $\Delta t$.

Fourth Embodiment

Figure 10:
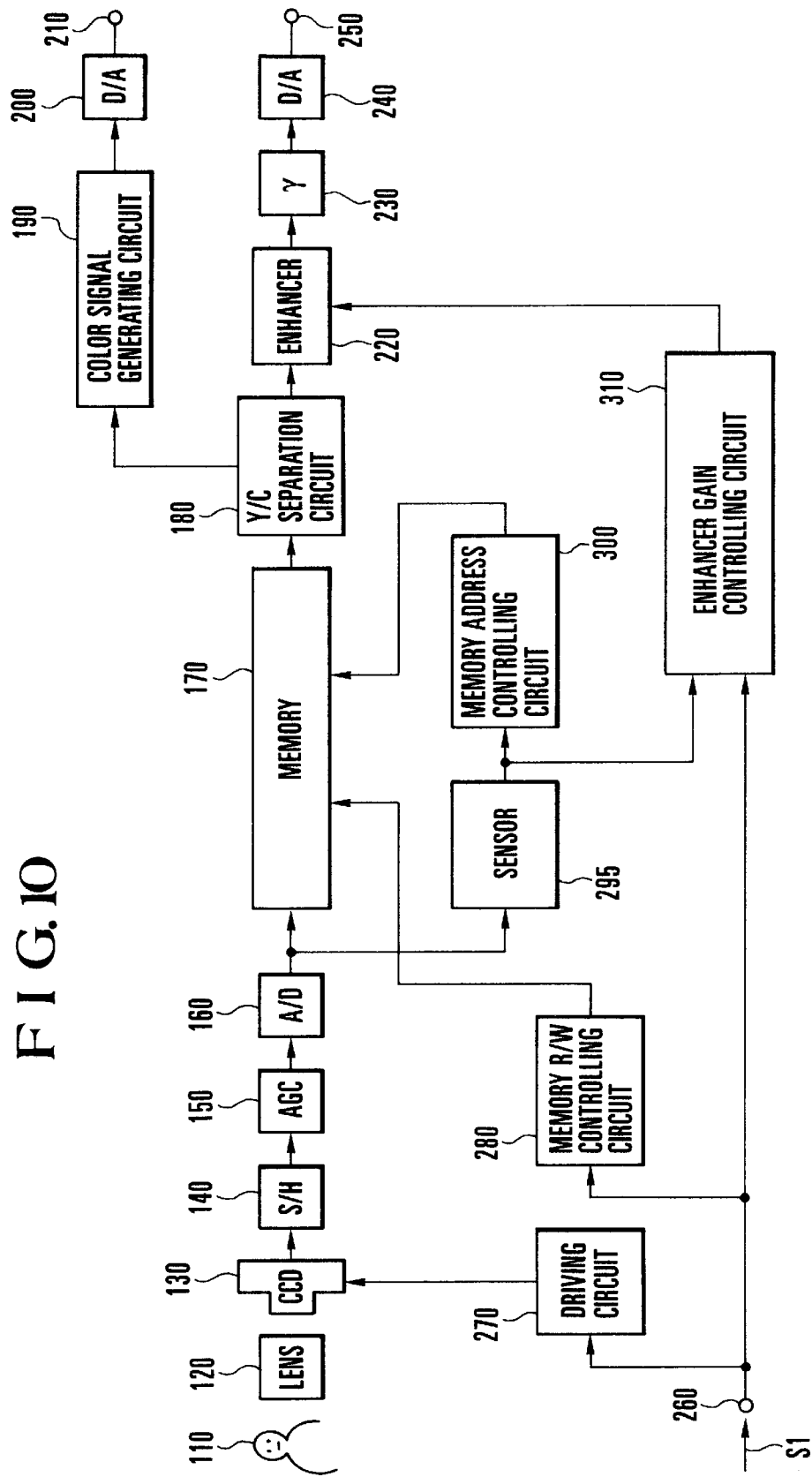
FIG. 10 is a block diagram showing an image pickup apparatus according to a fourth embodiment of the present invention.

A fourth embodiment of the image pickup apparatus according to the present invention will be described below with reference to FIG. 10. Although in the above-described third embodiment the amount of image deviation is obtained through the signal processing, the amount of motion of the image pickup apparatus itself may also be detected by using an external sensor. As shown in FIG. 10, in the fourth embodiment of the present invention, the motion detecting circuit 290 provided in the image pickup apparatus of FIG. 7 is replaced with a sensor 295.

A well-known type of external sensor is arranged in such a manner as to detect an angular speed by using the force of inertia of an object. However, such an external sensor is unable to cope with the case in which the image pickup apparatus is stationary while a subject is moving.

Since the third and fourth embodiments, as described above, are arranged to execute control to change the gain of an enhancer for aperture correction by using motion information about an image, it is possible to appropriately control the enhancer gain by securely discriminating between an originally unsharp edge which constitutes part of the shape of a subject and an edge which has been made unsharp by an image shake. Accordingly, it is possible to apply appropriate enhancement to various kinds of edges, whereby it is possible to provide an image of high quality under any photographic condition.

Figure 11:
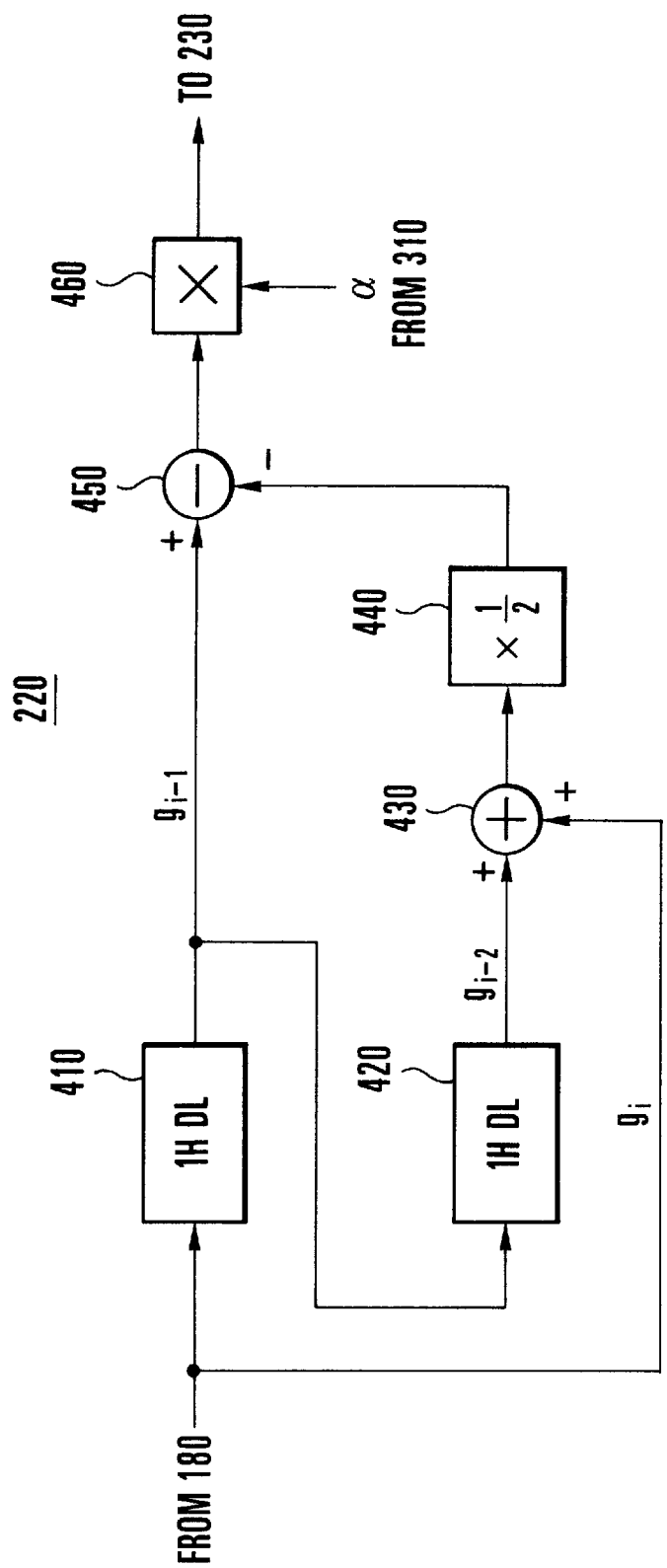
FIG. 11 is a block diagram showing one example of the arrangement of the enhancer for aperture correction used in the fourth embodiment.

FIG. 11 shows a circuit arrangement example of a vertical enhancer (vertical aperture correction). In thearrangement shown in FIG. 11, a video signal inputted from the Y/C separation circuit 180 is applied to two 1-line delay lines (line memories) 410 and 420. Owing to the operations of the 1-line delay lines 410 and 420, it is possible to perform computations on three lines: a line $g_i$ which is currently inputted; a line $g_{i-1}$, which was inputted a 1-line period before the line $g_i$; and a line $g_{i-2}$ which was inputted a 2-line period before the line $g_i$.

The current line $g_i$ and the line $g_{i-2}$ which was inputted a 2-line period before are added together in an adder 430, and the output from the adder 430 is multiplied by ½ by a coefficient multiplier 440. Then, in a substractor 450, the result of this computation is subtracted from the line $g_{i-1}$ which was inputted a 1-line period before. The process of the above-described computation is represented as follows:

$$g_{i-1} - (g_i + g_{i-2})/2$$

Accordingly, the above-described computation process means that the lines above and below the line (reference line) $g_{i-1}$ which was inputted a 1-line period before are each multiplied by $-\frac{1}{2}$ and the reference line $g_{i-1}$ is multiplied by $+1$ and the results of both multiplications are added together.

This means that a vertical second-order differentiation (Laplacian) is performed on the image signal, and the spatial high-frequency component of the image, such as a contour component, is extracted. This high-frequency component is multiplied in a multiplier 460 by a constant $\alpha$ determined by the characteristics of the image pickup system of the apparatus. The result of the multiplication performed by the multiplier 460 is outputted to the gamma correction circuit 230.

What is claimed is:

1. An image pickup apparatus comprising:

a) image pickup means;

b) memory means for storing an output of said image pickup means;

c) zoom magnification control means for varying zoom magnification of an output of said memory means;

d) interpolating means for interpolating the signal outputted from said memory means, said interpolating means varies interpolation of said memory means output signal on the basis of said zoom magnification controlled by said zoom magnification control means;

e) edge enhancing means for applying edge enhancing to a signal outputted from said interpolating means; and f) controlling means for varying edge enhancement by said edge enhancing means in accordance with said zoom magnification controlled by said zoom magnification control means.

2. An image pickup apparatus according to claim 1, further comprising timing control means for timing for writing in the memory and timing for read out from the memory.

3. An image pickup apparatus according to claim 2, wherein said timing means controls the timing for writing in the memory and the timing for read out from the memory on the basis of a control signal from the zoom magnification control means.

4. An image pickup apparatus, comprising:

a) image pickup means;

b) memory means for storing an output of said image pickup means;

c) magnification control means for varying magnification of an output of said memory means;

d) interpolating means for interpolating the signal outputted from said memory means;

e) edge enhancing means for applying edge enhancing to a signal outputted from said interpolating means; and f) controlling means for varying edge enhancement by said edge enhancing means and interpolation characteristics of the output signal of said memory means by said interpolating means in accordance with magnification controlled by said magnification control means.

5. An image pickup apparatus according to claim 4, further comprising timing control means for timing for writing in the memory and timing for read out from the memory.

6. An image pickup apparatus according to claim 5, wherein said timing means controls the timing for writing in the memory and the timing for read out from the memory on the basis of a control signal from the magnification control means.

* * * * *

UNITED STATES PATENT AND TRADEMARK OFFICE
CERTIFICATE OF CORRECTION

PATENT NO. : 5,838,371

DATED : November 17, 1998

INVENTOR(S) : Hisataka Hirose, et al.

It is certified that error appears in the above-identified patent and that said Letters Patent is hereby corrected as shown below:

Col. 6, line 4, delete "nor" and insert -- or --.
Col. 9, line 45, delete "thearrangement" and insert -- the arrangement --.

Signed and Sealed this

Twenty-fourth Day of October, 2000

Attest:

Q. TODD DICKINSON

*Attesting Officer*     *Director of Patents and Trademarks*